United States Patent
Bongers-Ambrosius et al.

(10) Patent No.: US 6,640,205 B2
(45) Date of Patent: Oct. 28, 2003

(54) METHOD AND DEVICE FOR INVESTIGATING AND IDENTIFYING THE NATURE OF A MATERIAL

(75) Inventors: Hans-Werner Bongers-Ambrosius, Munich (DE); Roland Schaer, Grabs (CH); Hans Böni, Buchs/SG (CH); Harald Schmitzer, Feldkirch-Nofels (AT)

(73) Assignee: Hilti Aktiengesellschaft, Schaan (LI)

( * ) Notice: Subject to any disclaimer, the term of this patent is extended or adjusted under 35 U.S.C. 154(b) by 182 days.

(21) Appl. No.: 09/735,340

(22) Filed: Dec. 12, 2000

(65) Prior Publication Data

US 2002/0050168 A1 May 2, 2002

(30) Foreign Application Priority Data

Dec. 16, 1999 (DE) .......................................... 199 60 824

(51) Int. Cl.[7] .......................... G06F 15/00; H03F 1/26; H04B 15/00
(52) U.S. Cl. ................................ 702/190; 702/2; 408/8
(58) Field of Search ............................ 173/2, 46, 171; 408/1, 8, 9; 702/33, 56, 189, 190

(56) References Cited

U.S. PATENT DOCUMENTS

| | | | |
|---|---|---|---|
| 3,464,503 A | | 9/1969 | Houck .......................... 173/20 |
| 4,671,366 A | * | 6/1987 | Uitto et al. ..................... 173/2 |
| 5,020,378 A | * | 6/1991 | Hesthamer et al. .......... 324/209 |
| 5,289,886 A | * | 3/1994 | Shikata et al. ............... 173/181 |
| 6,085,121 A | * | 7/2000 | Stern ............................ 340/680 |

FOREIGN PATENT DOCUMENTS

| | | |
|---|---|---|
| DE | 4334933 | 4/1995 |
| EP | 0771619 | 5/1997 |
| GB | 2333155 | 7/1999 |
| WO | 9625881 | 8/1996 |
| WO | 9801736 | 1/1998 |

* cited by examiner

*Primary Examiner*—John Barlow
*Assistant Examiner*—Stephen Cherry
(74) *Attorney, Agent, or Firm*—Sidley Austin Brown & Wood, LLP

(57) ABSTRACT

The method of and a device for using this method, on equipment or assigned to equipment for working a material, for investigating and identifying the nature of the material, which is to be worked and for making available at least one operating parameter for the optimized pre-setting of the working equipment, provides for the use of a sensor, preferably assigned directly to the working tool, such as a hammer drill, in order to detect shock waves generated or induced in the tool. From the shock wave signal measured, at least one distinguishing feature characteristic of the material to be worked, is extracted and evaluated for the comparative classification of the material by means of an algorithm. Preferably, an external force, especially the contacting force, acting on the working equipment, is taken into consideration for the algorithmic evaluation.

11 Claims, 3 Drawing Sheets

METHOD AND DEVICE FOR INVESTIGATING AND IDENTIFYING THE NATURE OF A MATERIAL

BACKGROUND OF THE INVENTION

The invention relates to a method of and a device for utilizing this method, for investigating and identifying the nature of a material, to be worked, and for making available at least one operating parameter for the optimized pre-setting of a working device.

Different specialized equipment are presently used for optimally working materials such as, e.g. concrete, bricks, tiles, etc., particularly, for producing holes in such materials that are capable of holding dowels. When only one device, e.g. a hammer drill, is used to work on different types of materials, at least some of the equipment parameters, such as the "impact frequency", the "individual impact energy" and the "rpm" must be adjustable. Furthermore, if the adjustment of at least some of these parameters is to be automatic to facilitate the operation of such working devices, an automatic identification of the material is required.

In the art of material testing, various methods for determining certain material properties are known. Reference is made especially to the subject of the "Non-Destructive Testing of Materials in Construction" in Schickert, G., Presentations and Poster Reports at the International Symposium on Non-Destructive Testing in Construction, Deutsche Gesellschaft für erstörungsfreie Prüfung e.V., Berlin; 1991 and Schickert, G., Wiggenhauser, H., International Symposium Non-Destructive Testing in Civil Engineering (NDT-CE), Deutsche Gesellschaft für erstörungsfreie Prüfung e.V., Berlin; 1995. From the mining sector, a method is known from Aquila Mining Systems Ltd. (www.aquilaltd.com/aquila/aquila.htm), by means of which the nature of the material, which is to be worked, can be determined in real time by an analysis of vibrations. Likewise, a method is disclosed, with which automatic identification of different types of rock is said to be possible by measuring the drilling parameters, such as the torque, the contacting pressure, the rpm and the drilling speed. See Pollitt, M. et al., Lithological interpretation based on monitored drilling performance parameters, CIM Bulletin, Volume 84, No. 985, July 1991, pages 25–29.

In the German patent 3 518 370 (compare to reference Uitto V., Method for Optimizing Impacting Rock Drilling, German Patent 3 518 370, 1985.), a method is described, for which the shock wave is controlled while drilling rock. The measured shock wave or parameters derived therefrom, such as the spectrum, the decay behavior and the amplitude values are compared with a nominal value. By changing one or more of the regulated variables, such as the impact frequency, the impact force, the rpm, the torque and/or the advancing force, the deviation of the quantity measured from the nominal value is kept to a minimum.

Methods are also known from the machinery industry, by which bearing damage can be recognized by analyzing audible sound. Similar methods are used in quality control, for example, for checking flow. See Wagner, J., Automatic Quality Control Systems for the Roof Tile Industry, Keramische Zeitschrift, Volume 47, No. 6, 1995 and Jonuscheit, H., Neuronal Networks in Production, Design & Elektronik.

The aforementioned art have various problems or disadvantages, which the invention overcomes. In particular, the methods, used in testing a material, are expensive, require special test equipment or cannot be automated and/or used online. Moreover, sensing experiments during vibration analysis showed that, in hand-held hammer drilling equipment, for example, identification of the material is not possible on the basis of an analysis of the housing vibrations. Identification by means of an analysis of the tools, such as the drill vibrations, is conceivable. In working equipment of the type under consideration here, particularly, drill hammers, such a measurement can be realized, if at all, only with difficulty. Further, the identification of the material by measurement of the drilling parameters is only possible if all of the mentioned parameters are known, since such parameters have a great mutual effect on one another. Thus, a very extensive sensory analysis is required. Finally, there is a great dependence on the tool used, e.g. on the drill.

SUMMARY OF THE INVENTION

A primary object of the invention is to provide a method of and an apparatus, by which, during or immediately prior to a working process, e.g. a drilling process, the nature of the material to be worked is identified, in order to automatically set, with the help of the data so obtained, at least some of the operating parameters of the working equipment, essential for an optimum working process.

This object is accomplished for a method, described generally above, for investigating and identifying a material, intended to be worked on, due to the fact that prior to or at the beginning and during a working process, a shock wave, generated or induced in a tool of the working equipment, is detected and at least one distinguishing feature, characteristic for the material, is extracted from the shock wave signal so measured and evaluated for classifying the material by means of an algorithm.

The material is identified by an algorithmic analysis of longitudinal waves. These may be, for example, the shock wave measured directly in the tool or the sound waves, particularly, audible sound waves radiating from the tool or the material.

During the classification of the material, for a more accurate evaluation, provisions are made that at least one external force acting on the working device, such as the contacting force, is included in the subsequent signal processing.

The shock wave can be measured by sensors, based on the magneto-elastic (ME) effect, on the basis of expansion strain gauges or on the basis of surface waves. Sound waves, especially, sound waves in the air, are measured, for example, by a microphone.

In the subsequent extraction of distinguishing features, certain properties, such as the decay behavior, the spectra and the energy of the measured signals are calculated by suitable algorithms, as described in the following examples, which are not, however, intended to limit the invention. On the basis of these properties, a decision is made, in the subsequent classification, as to the material that is present in a particular case. Additionally, an externally acting force, especially, the contacting force of the user of the device, can be used as a further auxiliary quantity for this decision. In the simplest case, this auxiliary or additional quantity serves for calculating or evaluating the signal cluster obtained more accurately.

When several distinguishing features are calculated and the results of these calculations are then weighted and combined into an overall decision, such a process is advantageous and improves the accuracy of the material classification appreciably. For this purpose, methods, which are assigned to the field of so-called "artificial intelligence", such as fuzzy logic systems or neuronal networks, can be used. Table 1 below gives an overview of the different possibilities for detecting signals and extracting distinguishing features during the identification of the material, including the tools used, particularly, the drills used.

TABLE 1

Identification of material and tool (drill) by measurement and analysis of longitudinal waves

| Body sound Measurement with microphones | Audible sound/shockwave Measurement with ME sensors Elongation strain gauges Surface wave | |
|---|---|---|
| Time domain methods | FFT-based distinguishing features | Methods based on autoregressive (AR) models |
| Analytical methods | | |
| Extreme values Energy quantile Impact length/- decay Band pass filtration | Average value Symmetry of the first inherent frequency Energy Center of gravity | Damping Position of the inherent frequencies Center of gravity of the spectra |

A preferred embodiment for investigating and identifying the nature of a material intended to be worked by a hammer drill, including the identification of the drill, which the user intends to use, based on the measurement and analysis of the shock wave in the drill, is explained in greater detail in the following description with reference to the following drawing, in which

DESCRIPTION OF THE EMBODIMENTS

For this tested variation of the invention, the material is determined by calculating four distinguishing features and subsequently making a weighted decision.

Figure 1:
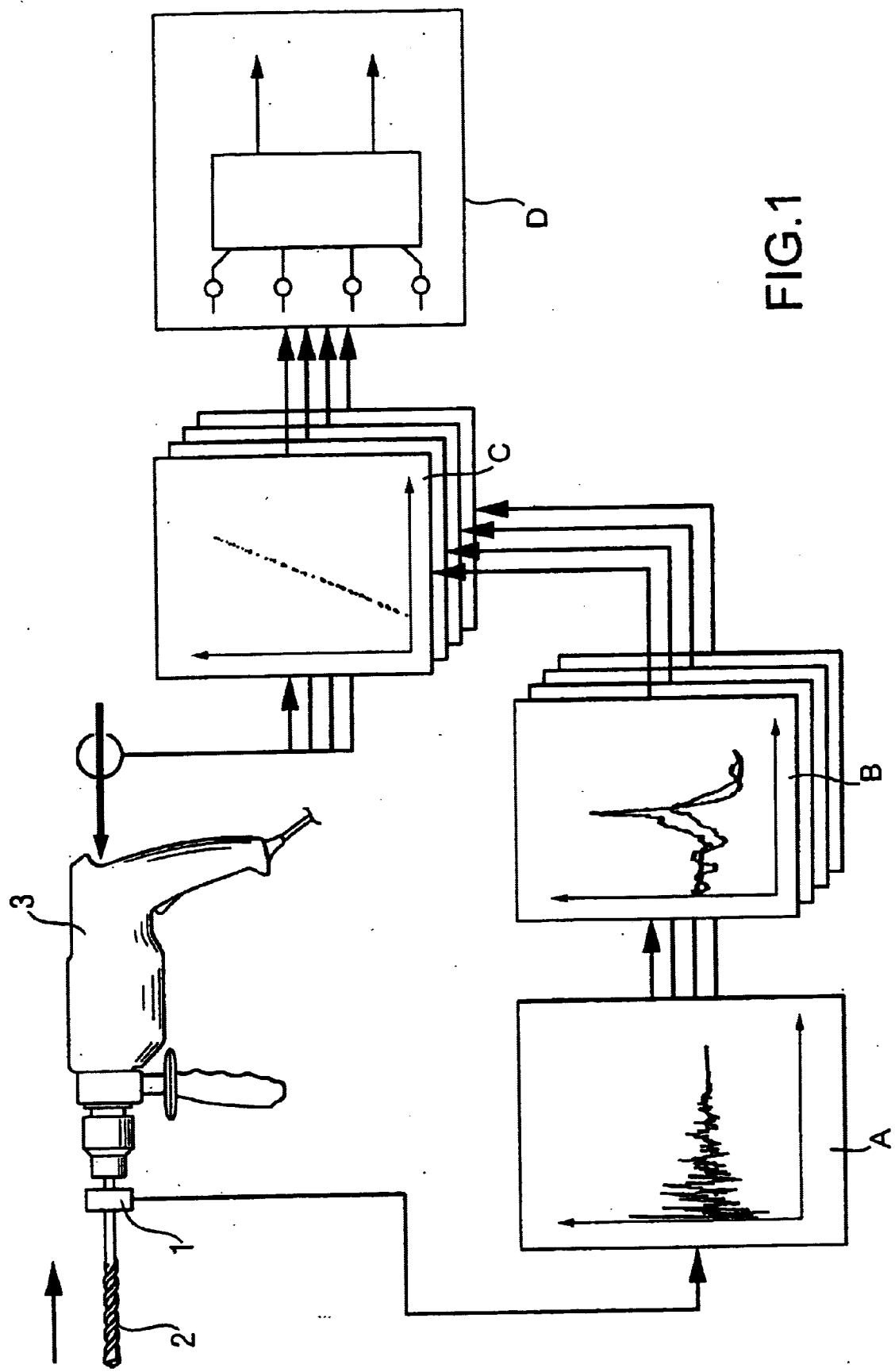
FIG. 1 shows a basic arrangement for the measurement and identification of a material, which is to be worked, in accordance with the invention.

As can be seen in FIG. 1, a sensor 1, which works according to the magnetoelastic effect (described in Hecker, R., Schröder, P., Utilization of Mechanical and Electromechanical Effects for Measuring Elastic Waves in Rods, tm 11/95, R. Oldenburg Verlag) is used for the measurement of the shock wave in the drill 2 of a hammer drill 3. The ME sensor 1 surrounds the shaft of the drill 2, in a ring fashion, and comprises an excitation winding, which surrounds a soft magnetic material, and a sensor coil, which is disposed within the soft magnetic sheathing and surrounds the shaft of the drill within the excitation winding. The sensor signal is measured in Block A. For the verification by measurement using the inventive method, sensor 1, with a shaft diameter of 10.6 mm and an axial length of about 18 mm was used for a drill 2 with a shaft diameter of 10 mm. The excitation winding is supplied with a direct current of 2 A. The excitation winding has 390 windings, a wire diameter of 0.5 mm and an ohmic resistance of 3.8 Ω. For the sensor coil, disposed within the excitation winding, the following values were fixed: number of windings: 540, wire diameter: 0.13 mm, coil resistance: 37 Ω.

The sensor signal is algorithmically evaluated in block B. The preferred algorithms for extracting the distinguishing features for determining the material are described below for a specific drill type. Without limiting the universality, it is possible to proceed analogously since different drills differ only due to the use of different parameter settings at the hammer drill 3 and weights or fuzzy rules for the settings of the final decision. The method, described below, is given for a drill with a diameter of 6 mm and a length of about 170 mm.

The identification of the drill, which permits the correct presetting of the drill-dependent equipment parameters, is linked with the extraction of distinguishing features for the determination of the material, but precedes the actual algorithms for identifying the material.

All methods, described in this example, are based on the analysis of individual impacts $E_i$, which are considered in mutually synchronized windows with a fixed length of, for example, 1024 sensing values. The sensing values of an impact $E_m$ are labeled $s_{m,i}$ (i from [1,1024]). In the present context, synchronized means that the impact starts are always at the same position relative to the start of the window.

For the preceding calculation of the drill type, initially the average spectrum of a certain number of initial sensing values, for example, of the first 250 sensing values of all previously recognized and separated individual impacts are calculated by the following equation:

$$\overline{F}(\omega) = \frac{1}{n}\sum_{i=1}^{n} F_i(\omega), \qquad (1)$$

in which $F_i=|FFT(S_{i,1 \ldots 1024}|$ are the individual spectra of the individual impacts. The variable $\omega$ represents the index of the frequency sought. For this average spectrum, three inherent frequencies are then determined, for example, the local maxima in the specified ranges. Because of the second and third inherent frequency, the length and diameter of the drill are then calculated over a fuzzy control algorithm of the Sugeno type, which will be explained in greater detail below. In block C in combination with block D, which comprises the fuzzy classification, the at least one distinguishing feature for characterizing the drill over the shock wave and the material are determined and at least one operating parameter is set in drill hammer 3.

In calculating the distinguishing features of the material, a differentiation is made between two averaging methods, which can be employed.

1. Averaging of the distinguishing feature values calculated for the individual impacts:

$M_E$=Mean $(E_i)$

2. Calculation of the distinguishing features for the average of the individual impacts, determined in the time domain, $M_E$=M (Mean($E_i$))

Unless stated otherwise, averaging method 1 is used for the calculation of individual characteristic distinguishing feature, described below.

The first distinguishing feature M1 (referred to also as FFT-Mean in the following), is calculated as the average amplitude of the energy standardized spectrum $F_{en}$, determined by the use of a fast Fourier transformation (FFT) of an individual impact, related to 1024 scanning points. Before an FFT, the input signal is still high-pass filtered, for example, by means of an FIR filter with a linear phase with an order 22 and a limiting frequency of 10 kHz (compare Mathworks Inc., Matlab-Manual: System Processing Toolbox, Mathworks Inc.: 1998, section FIR1). The distinguishing feature M1 is thus given by $$M_1 = \overline{F}_{en} = \frac{1}{n}\sum_{w=1}^{n} F_{en}(\omega), \qquad (2)$$

in which F is the FFT spectrum of the actual individual impact.

The energy-standardized spectra $F_{en}(i)$ are calculated from the following formula:

$$F_{en}(\omega) = \frac{F(\omega)}{\sum_{\theta=1}^{n} F(\theta)^2} \qquad (3)$$

The averaging method 2, given above, is used for this distinguishing feature M1. For the second distinguishing feature M2, in each case n samples, commencing with the start of the impacts, are considered, for example, n=15 for the above-mentioned 6/17 drill; this corresponds to a short time window of 0.15 ms. For this short time signal, a spectral estimation is then carried out by calculating an autoregressive model (AR model). The AR model used has the order 5 and is calculated using a Burg iteration method (see Kammeyer, K., Digital Signal Processing, Teubner Studienbücher-Elektronik: 1998 and Mathworks Inc., Matlab-Manual: System Identification Toolbox, Mathworks Inc.: 1998, chapter Matlab function AR). The results are the filter coefficients of a recursive filter. Subsequently, the associated spectrum $F_{AR}$ is determined, for example, for 128 points (compare in Kammeyer, K., Digital Signal Processing, Teubner Studienbücher-Elektronik: 1998 and Mathworks Inc., Matlab-Manual: System Identification Toolbox, Mathworks Inc.: 1998, chapter Matlab function TH2FF). In this spectrum, in a drill-specific region, for example, in the region from 4 to 14 kHz for the 6/17 drill, a search is then conducted for the frequency $f_m$ with the maximum amplitude input.

Subsequently, four characteristic numbers are taken into consideration for this maximum:

1. Amplitude: $F_{AR}(f_m)$
2. Frequency: $f_m$
3. Geometrically defined damping D:

$$D = \frac{\sum_{i=fm-\Delta f}^{fm+\Delta f} F_{AR}(i)}{2c\Delta f} \qquad (4)$$

4. Linear linkage of frequency and amplitude→combination function CO:

$$CO(f_m, F_{AR}(f_m)) = af_m + bF_{AR}(f_m) + c \qquad (5)$$

In each case, the most suitable characteristic number is selected, depending on the respective drill type. The respective selection is predefined for each drill type and determined by optimizing the reference data. For the 6/17 drill, which is under consideration here, this is the combination variation "4" with the parameters a=1/15, b=13/1500 and c=−265/3. With that, the second distinguishing feature is found to be:

$$M_2 = \frac{fm}{15} + \frac{13F_{AR}(fm)}{1500} - \frac{265}{3} \qquad (6)$$

As is evident from above, the distinguishing feature M2 can also be referred to as AR spectral damping.

As for the above determination method for the distinguishing feature M2, AR models are also used for the third distinguishing feature M3. However, different model parameters and a different iteration schedule is selected here: the order is 5, the input signal has a length of 22 samples and the forward backward approach is used, that is, the Matlab function for AR with argument "fb" (see in Kammeyer, K., Digital Signal Processing, Teubner Studienbücher-Elektronik: 1998 and Mathworks Inc., Matlab-Manual: System Identification Toolbox, Mathworks Inc.: 1998, Metlab function TH2FF). As a result, the filter coefficients $a_i$ of the associated recursive filter are obtained. From these coefficients, the poles $P_i$ of the filter are calculated and transferred to the S plane (log) and conjugated complex pole pairs are sought. Of these conjugated pole pairs, the poles with a positive frequency are taken into consideration and sorted in accordance with their respective damping (real part). The pole with the least damping $P_m$, is then checked to determine whether such pole lies in the interval (f−$\Delta_f$, f+$\Delta_f$) that is sought for the drill in question. This interval, depending on the distinguishing feature extraction carried out at the beginning for a respective drill type, for which in this case the 6/17 drill type was recognized, is fixed by f=10 kHz and Δf=5 kHz with respect to the distinguishing feature M3. If the pole fulfills this condition, the value of this third distinguishing feature M3, which is also referred to as the AR damping coefficient, is equal to the damping of the pole $$M_3 = Re(Pm) \qquad (7)$$

If the pole does not fulfill this condition, the actual individual impact in question is disregarded in the case of the first averaging method, which is used as a basis.

Figure 3:
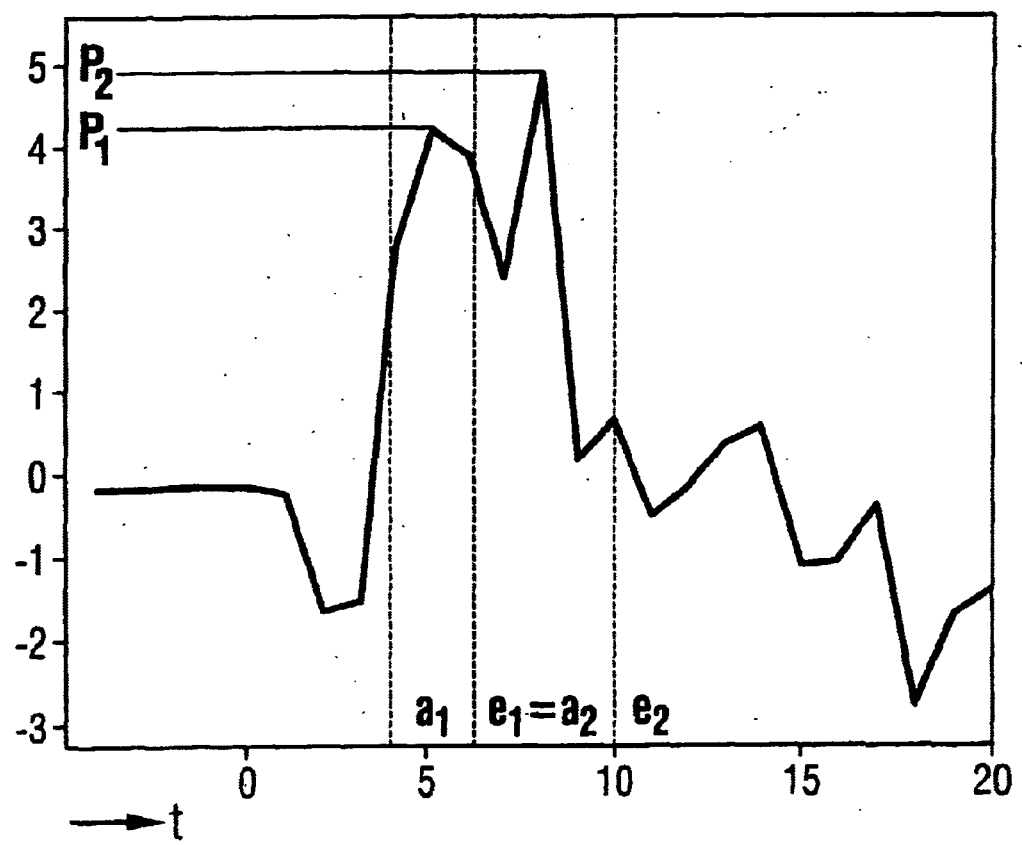
FIG. 3 shows the relative strength of the reflections of a shock wave in the tool in a time-amplitude diagram.
Figure 4:
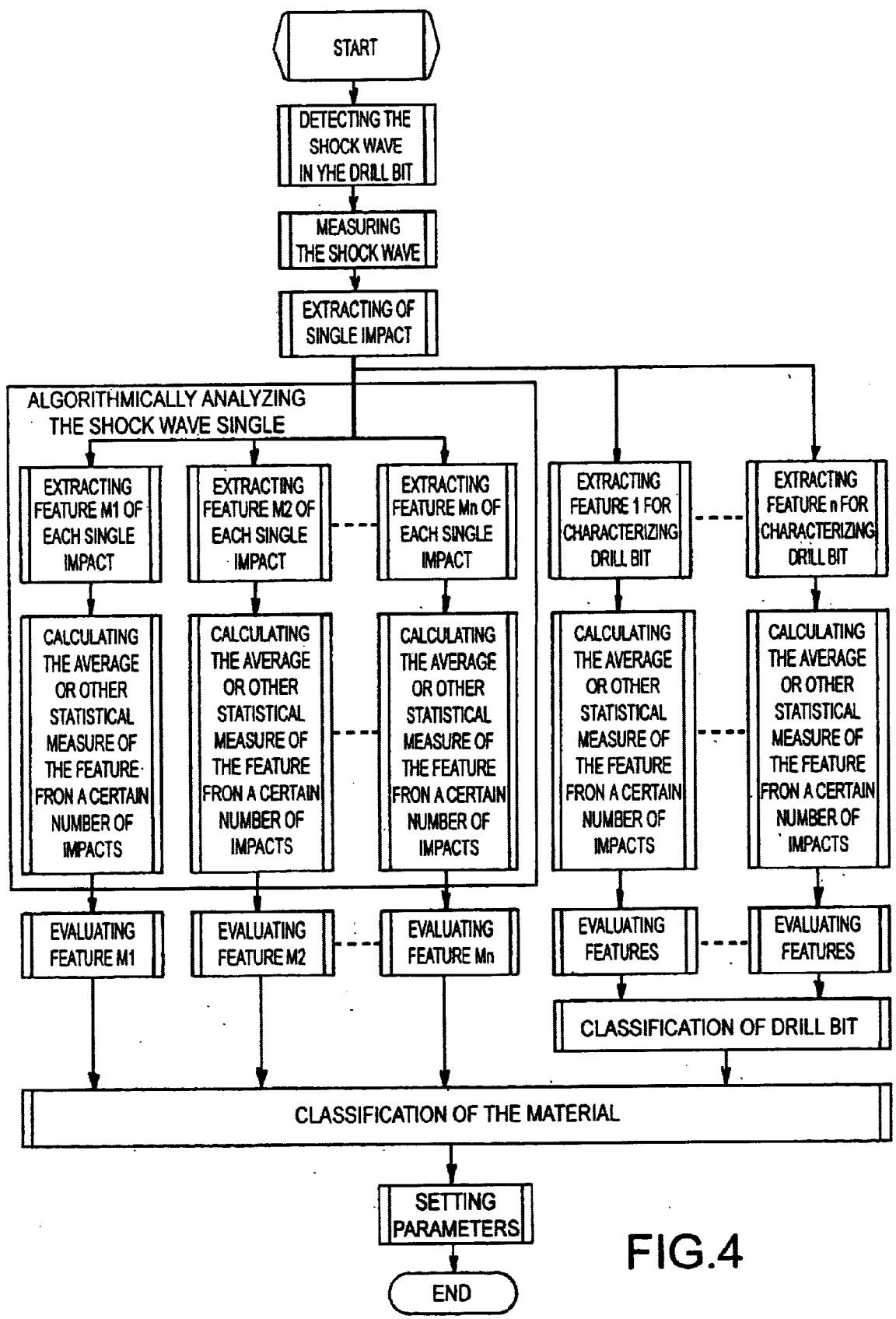
FIG. 4 shows a method of investigating and identifying the nature of a material to be worked and for making available at least one operating parameter for the optimized pre-setting of a hammer drill, inccordance with the invention.

In order to use the different strengths of the reflections of the shock wave as a fourth distinguishing feature M4, the step heights are analyzed, in the time range, in the signal $s_i$. The first and second positive maxima $P_1$ and $P_2$, respectively, and the difference between these two maxima (see FIG. 3) are of decisive importance here $$Pj = \max_{i=a_j}^{ej} s_i,$$

with j ∈ 1,2, that is, the number of the maximum and $a_j$ the start or $e_j$ the end of the search, interval. When a scanning frequency of 100 khz is used, in each case (4,6) or (6,10) are used for the pair (s,e). The fourth distinguishing features also referred to as step heights in the time range, is then given by $$M_4 = P_1 - P_2 \qquad (8)$$

Before the distinguishing features Mi (for example, i=1, 2, 3, 4) are evaluated, it is of advantage to carry put a correction, which depends on the contacting pressure of the user of the equipment. This correction is given by the following general formula $$M'_i = M_i - f_{i,B}(p) \quad (9)$$

in which B is the index of the identified drill and p the averaged contacting pressure. The advantage of this correction is that the effect of the contacting pressure p on the distinguishing features $M_i$ is eliminated and, with that, only the effect of the material, which is to be investigated, remains. In order to simplify the representation, the expression $M_i$ is used again in the following for the individual distinguishing features. Implicitly, it is understood to be the corrected distinguishing feature $M'_i$.

In the case of the 6/17 drill, which was investigated here as an example, the following correction functions were used as a basis:

$$f_1 = 8.7 - p/100$$

$$f_2 = 0$$

$$f_3 = 1.4 - 50_P$$

$$f_4 = -1 \quad (10)$$

The form and coefficient of the correction functions were obtained from the reference data by optimization.

The given indexing corresponds to the one used above with reference to the distinguishing features $M_i$, for example, "1=FFT-Mean". The drill index B (6/17=1.8/17=2.10/17=3 etc.) was omitted because it is always fixed for this variation (6/17 drill). Functions, which are independent of p, serve only for shifting the value range, so that, with respect to this distinguishing feature, the material boundary is at 0. A material boundary of "0" means that all distinguishing features should give values smaller than 0 for concrete and larger than 0 for brick.

Subsequently, using the distinguishing feature values $M_i$ obtained, a weighted decision is made by means of a fuzzy system.

For the combination of the individual distinguishing features $M_i$, a fuzzy interference system, based on the Sugeno method, is used. As explained in the following, the weighted decision is a special case of this interference technique. In general, fuzzy control systems of the Sugeno type (see Mathworks Inc., Matlab-Manual: Fuzzy Logic Toolbox, Mathworks Inc. 1998 and Kruse, et al., Fuzzy Systems, Teubner Verlag 1989) are built up from rules of shape.

$$R^i, w_i: \text{if } x_i \text{ is } A_j^i \text{ and } \ldots \text{ and } x_k \text{ is } a_k^i \text{ then } u_i = p_o^i + p_j^i x_j + \ldots + p_k^i x_k, \quad (11)$$

with:

$A_j$: fuzzy amount fixed by membership functions
$x_j$: sharp input quantity=distinguishing feature values $M_j$
$p_j^i$: parameter weight for $x_j$
$u_i$: output quantity of the ith rule
$w_i$: weight of the ith rule for the calculation of the decision.

The output of this interference system is then given by $$u = \frac{\sum w_i u_i \mu_i}{\sum w_i u_i}, \quad (12)$$

in which $\mu_i$ gives the degree of fulfillment of the ith premise. This degree of fulfillment is calculated based on the T standard used, that is, the linking of the individual conditions "$x_j = A_j^i$" over $$\mu_i = \prod_{j=1}^{n} (a_i^j(x_j)), \quad (13)$$

with $a_i^j$ as the membership function describing the fuzzy set $A_i^j$.

The algebraic product is selected as T standard. The use of the so-called min function, for example, would be another possibility.

Figure 2:
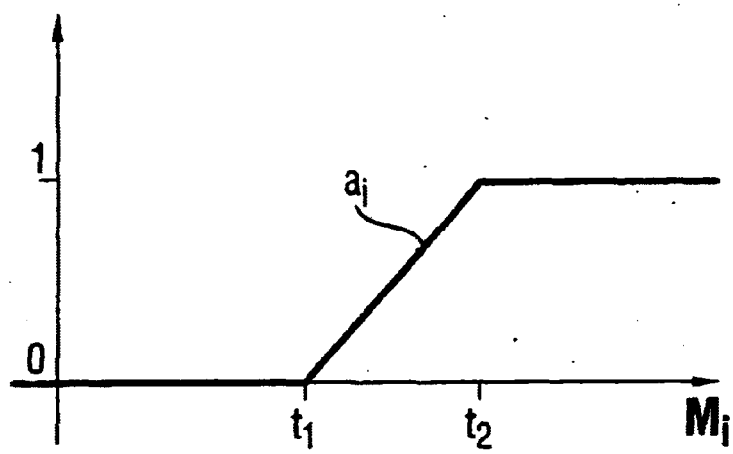
FIG. 2 shows a representation of a fuzzy set Ai with the orientation 1.

In a concrete variation of an embodiment, a simplified rule of the following form was used:

$$R^i, w_i: \text{if } x_1 \text{ is } A_1^i \text{ then } u_i = 1.$$

the fuzzy sets $A_1^i$ reproducing linear functions of FIG. 2 piecewise.

These fuzzy sets are then defined in each case by specifying two parameters $t_1$ and $t_2$. By means of the parameter orientation o, it is then possible to establish whether fuzzy sets are described, which are left 0 (orientation 0) and right 1 (orientation 1) or left 1 or right 0 (orientation −1).

For the output value for this specific form, the following results:

$$u = \frac{\sum_{i=1}^{n} w_i a_i(x_i)}{\sum_{i=1}^{n} w_i} \quad (15)$$

The final decision is then carried out by querying a simple threshold value, that is, in the example shown in FIG. 2

$u < t_B \rightarrow$ "base material is concrete"

$u \geq t_B \rightarrow$ "base material is brick".

The threshold value $t_B$ depends on the recognized drill and amounts to 0.5 for the 6/17 drill considered as example here. For this concrete case, the following parameters of Table 2 below are to be used.

TABLE 2

| Distinguishing Feature | Weight $w_i$ | Parameter $t_1$ | Parameter $t_2$ | Orientation |
|---|---|---|---|---|
| Mean FFT | 1 | −0.5 | 0.5 | −1 |
| AR spectral damping | 2 | −1 | 1 | 1 |
| AR coefficient damping | 1 | 16000 | 22000 | −1 |
| Peak difference | 1 | 0.5 | 0.5 | −1 |

What is claimed as new and desired to be protected by letters patent is set forth in the appended claims.

What is claimed is:

1. A method of investigating and identifying the nature of a material, to be worked and for making available at least one operating parameter for the optimized pre-setting of a hammer drill, comprising the steps of:

detecting a shock wave generated or induced in the drill, before or at the beginning of or during a working process;

measuring the shock wave signal;

algorithmically analyzing the shock wave signal;

algorithmically evaluating at least one distinguishing feature (M1 to M4), characteristic of the material, from the shock wave signal, for classifying the material;

determining the at least one distinguishing feature for characterizing the drill over the shock wave and the material; and on-line setting at least one of the operating parameters comprising "impact frequency", "individual impact energy" and "rpm".

2. The method of claim 1, further comprising the steps of using an extracting algorithm to extract at least one characteristic distinguishing feature (M1 to M4) for identifying the material, wherein said extracting algorithm analyzes a plurality of shock wave signals ($E_i$), corresponding to individual hammer drill impacts and digitized into sensing values within mutually time-synchronized windows with respect to the start of the impacts, and wherein an averaging method is used to determine a characteristic distinguishing feature value ($M_1$ to $M_4$) from the calculated distinguishing feature values of the individual hammer drill impacts.

3. The method of claim 2, wherein, before the step of algorithmic material identification, a tool identification step and a corresponding pre-setting of the operating parameters of the drill hammer step are performed, for which the average spectrum of a fixed number of sensing values of the shock wave signals of the individual impact spectra, determined during the course of a measurement, are calculated and several inherent frequencies, that is, local maxima in specified regions, are determined, of which at least two are used for determining tool parameters, required for the pre-setting of the operational parameters, by means of a fuzzy control algorithm.

4. The method of claim 2, wherein the step of algorithmically identifying the material comprises the step of considering at least several of the following characteristic distinguishing features (M1 to M4), of which a first distinguishing feature (M1) contains the average amplitude, calculated in the time domain of the averaging method comprising the step of using the distinguishing feature values calculated for the individual drill hammer impacts as a basis for the averaging ($M_E$=Mean ($M(E_i)$)), of the energy-standardized spectrum ($F_{en}$) of a single impact shock wave signal over the window under consideration, a second distinguishing feature (M2), considers a tool-specific frequency range and uses an autoregressive model of a short signal to provide at least one of the maximum amplitude ($F_{AR}(f_m)$) and the associated frequency value ($f_m$) from a spectral estimate, wherein the autoregressive model considers at least one of only a few fixed digital values within the window and the damping, wherein the damping is determined over at least one of the frequency range and a linear combination function ($CO(f_m, F_{AR}(f_m))$) from the maximum amplitude ($F_{AR}$) and the associated frequency value ($f_m$), a third distinguishing feature (M3) representing the minimum damping value of a pole of a filter within a frequency interval ($\Delta_f$) is determined by the tool parameters, wherein the poles are calculated from the filter coefficients of an associated recursive filter that is determined over an autoregressive model of a single impact shock wave signal using fixed model parameters for positive frequency values and a fourth distinguishing feature (M4) provides the difference between two maxima of the same algebraic sign of the shock wave signal in the time range within a search interval; and at least several of the distinguishing features (M1 to MN) are evaluated and assigned weighting in the step of determining the material by a fuzzy interference system.

5. The method of claim 1, wherein an averaging method comprises the step of using the distinguishing feature values calculated for the individual drill hammer impacts as a basis for the averaging ($M_E$=Mean ($M(E_i)$)).

6. The method of claim 1, comprising the step of using the average of the individual hammer drill impacts, determined in a time range, as a basis for the determination of the distinguishing feature values ($M_E$=Mean ($M(E_i)$)).

7. The method of claim 6, wherein the fuzzy control algorithm is of the Sugeno type.

8. The method of claim 6, wherein before the step of evaluating over the fuzzy interference system, the step of correcting each of the distinguishing features by a factor depending on at least one of the contacting pressure and the respective tool is performed.

9. The method of claim 1, wherein the step of detecting comprises the step of using a sensor to detect the shock wave, wherein said sensor is based on a magnetoelastic effect, based on at least one of the principle of the expansion strain gauge and the principle of the surface wave measurement.

10. The method of claim 1, wherein the step of measuring further comprises the step of using a microphone to measure the air waves caused by the shock wave.

11. The method of claim 1, further comprising the step of using a sensor based on the magnetoelastic effect to determine a longitudinal component of the shock wave in a tool axis of the working device.

* * * * *